Patented Jan. 10, 1939

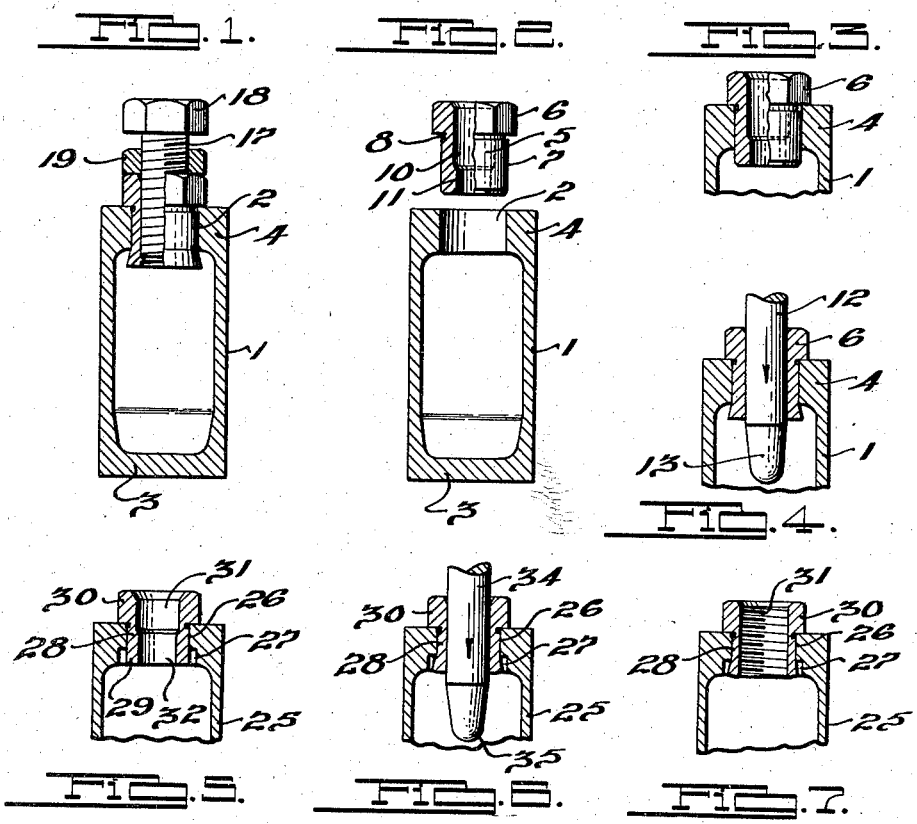

2,143,176

UNITED STATES PATENT OFFICE 2,143,176

VALVE TAPPET AND METHOD OF MAKING SAME

Frederick A. Welsmiller and Joseph H. Hoern, Saginaw, Mich., assignors, by mesne assignments, to Eaton Manufacturing Company, Cleveland, Ohio, a corporation of Ohio Application December 23, 1935, Serial No. 55,756

2 Claims. (Cl. 123—90)

This invention relates to valve tappets and to a novel and unique method of manufacturing valve tappets. More particularly it relates to that general type of valve tappet which has a substantially cylindrical body portion, a flat base portion adapted to engage the cam shaft of the motor with which it is used, and an internally threaded axially disposed aperture in its upper end adapted to receive an adjusting stud for accurately adjusting the effective length of the tappet.

While the specific embodiment of the invention disclosed in the drawing and described below in detail, is primarily directed to a valve tappet of the so-called barrel type, it will be apparent that the generic inventive concept disclosed will find practical utility in many other types of tappet construction.

Inasmuch as valve tappet bodies must necessarily be formed of some material which is highly resistant to wear, the body portions of these valve tappets are generally formed of cast iron or similar highly wear-resistant material. Inasmuch as most highly wear-resistant materials are, as a general rule, extremely brittle and generally unsatisfactory for most metal working operations, it has been found extremely unsatisfactory to tap threads for the reception of the adjusting stud or screw directly in the valve tappet body. This has been unsatisfactory for several reasons. In the first place, the brittle material of which the valve tappet body is formed provides a very unsatisfactory thread inasmuch as the tappet body is continually exposed to a series of shocks during its use and thread formed therein has a tendency to crack and become materially deformed and broken. In the second place, it is inherently essential that a lock nut or other equivalent means be used in connection with the adjusting stud in order to maintain this stud in predetermined axial position with respect to the valve tappet body. Due to the shocks and vibrations to which the structure as a whole is subjected, it is essential that this lock nut be drawn down tightly in order to insure a permanent and accurate adjustment of the position of the stud with respect to the tappet body. If the threads are cut directly into the surface of the tappet body, it has been found that the drawing down of this lock nut has a tendency to crack the threads and sometimes rupture the entire body structure. Failures of this character have become so common and so well recognized that it has been found entirely impractical to screw the adjusting stud or screw directly into the body of the tappet.

It is therefore a general object of the present invention to mount a collar or auxiliary element rigidly with respect to the valve tappet body and to provide means internally of the collar for receiving the adjusting stud or screw. Collars of this type are formed of metal which is considerably more ductile and malleable than the metal forming the body portion of the tappet structure and consequently the inherent defects discussed above are overcome.

It is a further object of the present invention to provide simple and effective means for permanently locking collars of this general construction in fixed and permanent relation with respect to the body portion of the tappet.

In one form the present invention contemplates the provision of a hollow substantially cylindrical tappet body structure, having an axial aperture therein. A shouldered collar is provided with a cylindrical skirt which is adapted to fit within this aperture and is of an axial length sufficiently long to extend substantially interiorly of the tappet body. Means are provided for expanding the skirt portion of the collar into tightly locking engagement with the valve tappet body and the collar is then internally threaded to receive the adjusting stud or screw. In constructions of this character, it will be appreciated that any of the stresses or strains imposed upon the threaded connection between the adjusting screw and the valve tappet body will be imposed upon the more malleable and ductile collar portion thereof and consequently the defects described above will be obviated.

Yet another feature of the present invention resides in the provision of an axial aperture in the valve tappet body which is undercut at its inner axial end in order to provide a shoulder or recess into which the lower portion of the skirt of the inserted collar may be expanded to effect a tight, locking engagement of the collar with respect to the valve tappet body.

Many other and further objects and advantages of the present invention will become apparent from the following specification when considered in connection with the accompanying drawing forming a part thereof.

In the drawing:

Fig. 1 is a vertical sectional view of a valve tappet showing the improved collar expanded into locking engagement with the body portion thereof.

Fig. 2 is a vertical sectional view of the tappet construction shown in Fig. 1, showing the construction of the collar prior to insertion into the body portion.

Fig. 3 is a fragmentary sectional view similar to Fig. 2, showing the collar after insertion into the body portion of the tappet.

Fig. 4 illustrates a step in the assembly operation showing the manner in which the lower end of the skirt is expanded to provide a locking engagement of the collar with respect to the body portion of the tappet.

Fig. 5 illustrates in section a modified form of the invention in which the skirt portion of the collar is of an axial length substantially the same as the axial length of the aperture in the valve body, showing the collar inserted in position in the valve body.

Fig. 6 shows the manner in which the skirt portion of the collar is expanded into locking engagement with the undercut portion of the aperture in the valve tappet body.

Fig. 7 illustrates the collar portion internally threaded and completely assembled with respect to the body portion of the tappet.

With more particular reference to the drawing and primarily to the preferred form of the invention illustrated in Figs. 1 to 4 thereof, the improved tappet construction shown, comprises a body portion 1, which may be formed according to any of the practices conventional in the art but is illustrated as comprising a casting of generally hollow cylindrical form and having an axial aperture 2 extending through one of the end walls thereof. This tappet is of the so-called barrel type and is preferably formed of a single integral casting having a thickened hardened wall 3 at the lower axial end thereof adapted to engage the cam shaft with which the tappet is used. The opposite end wall 4 of this casting is preferably quite thick, relatively, in order to afford a maximum surface of engagement for the collar construction hereinafter described.

The improved insert collar in its completed form prior to insertion into the valve tappet body is clearly shown in Fig. 2. This collar comprises a head portion 6 and a cylindrical skirt portion 7 of substantially uniform diameter throughout its entire axial length and of an axial length slightly greater than the axial length of the aperture 2 in which it is adapted to be seated. As is conventional in constructions of this kind, the surface of the skirt portion 7 may be undercut or relieved at 8 adjacent the head portion 6 in order that the head portion will tightly seat against the adjacent surface of the valve tappet body when the collar is inserted into position. The collar as a whole is preferably formed of some material which is considerably more ductile and malleable than the valve tappet body in order that it may be deformed as hereinafter described to provide a tight locking engagement with the valve body in which it is inserted. The collar 5 has an axial bore 10 therethrough which is of slightly reduced diameter at its lower end 11 in order to effect an expansion of the lower portion of the skirt to provide the locking engagement of the skirt with respect to the body portion of the tappet.

From the foregoing, it will be clear that due to the uniform outer diameter of the skirt portion 7 of the collar, prior to its insertion into the valve body, the collar as a whole may be fitted into the aperture 2 in the valve tappet body 1 and due to the undercut or relieved portion 8 on the skirt portion of the collar, the head 6 will seat tightly in engagement with the end surface of the valve tappet body.

In order to effect expansion of the collar and locking engagement thereof with the body portion of the tappet, a plunger 12 is forced into the bore 10 of the collar and it may be seen by reference to Fig. 4 that the external diameter of this plunger is substantially the same as the bore 10 through the upper axial portion of the collar member. The plunger preferably has a rounded and tapered end 13 which will enter the reduced portion 11 of the bore through the collar and as the plunger is moved through the collar will effect an expansion of the lower portion of the skirt thereof, to tightly lock the collar in engagement with the body portion of the tappet. As has been explained above, the axial length of the skirt portion of the collar is substantially longer than the axial length of the aperture 2 in which the collar has been inserted and consequently the lower end portion of the skirt will extend interiorly of the body of the tappet and be expanded to a diameter greater than that of the aperture 2. As is clearly seen in Fig. 3, the reduced portion 11 of the bore through the collar, though mostly lying below the walls of the aperture 2, has its upper end portion adjacent the walls of the aperture. Consequently expansion of this portion of the skirt will not only enlarge the portion of the skirt below the lower end of aperture 2 but will also expand a portion of the skirt into tight locking relation with respect to the walls of aperture 2. This reduced portion 11 of the bore through the collar is preferably of a length and proportion such that upon insertion of the plunger 12 a tight locking of the collar with respect to the body portion of the tappet is effected without imposing sufficient strain upon the body portion to crack or rupture it around the aperture 2.

After the plunger 12 has been withdrawn, it will be appreciated that the bore extending through the collar 5 is of substantially uniform internal diameter and this bore may then be tapped to receive an adjusting stud 17 which is threaded to engage the internal thread of the collar. The adjusting stud 17 is preferably provided with a head portion 18 adapted to receive a wrench and having an upper surface adapted to engage the lower end of a valve stem or push rod and has threaded thereon a lock nut 19 which may be screwed down tight against the upper axial end of the head 6 of the collar.

The head 6 of the collar is preferably formed of a suitable configuration adapted to receive a wrench in order that the valve tappet body as a whole may be held against rotation during adjustment of the stud and lock nut with respect thereto. From the foregoing it will be appreciated that the construction described above and shown in Figs. 1 to 4 of the drawing provides a valve tappet in which the body of the tappet and the portions thereof subjected to wear may be formed of a material which is very hard and wear resistant although brittle, and further that the collar portion of the tappet which is adapted to receive the adjusting stud may be formed of relatively ductile metal and that the stresses due to the threaded engagement of the adjusting stud with the valve tappet and the strains inherent upon the drawing down of the lock nut 19 to accurately position the stud 17 are entirely borne by the relatively soft and ductile collar member forming a portion of the tappet structure.

In Figs. 5, 6, and 7 of the drawing a modified form of the invention is disclosed in which the collar may have a skirt portion having an axial length substantially the same as the axial length of the aperture in which it is inserted. In this form of the invention a valve tappet body 25 is formed of hard, wear resistant material substantially the same as the valve tappet body 1 described in connection with the preferred embodiment of the invention. This valve tappet body has an axial aperture 26 in one end thereof and this aperture is preferably undercut at 27 to provide an annular recess or portion of increased diameter interiorly of the tappet body. A relatively malleable collar 28 is provided having a cylindrical skirt portion 29 of external diameter substantially the same as the diameter of the aperture 26. This collar has a head portion 30 adapted to be seated on the upper axial end of the valve tappet body and has therethrough a bore 31 of increased diameter at its upper end and of reduced diameter at 32 in the skirt portion of the collar. A plunger 34 having a rounded, tapered end 35 is inserted through the collar and serves to deform the collar to provide an axial bore therethrough of substantially uniform diameter. As has been described above this deformation of the collar serves to expand the skirt portion thereof into engagement with the walls of the aperture 26 and also serves to expand the lower end of the skirt portion of the collar outwardly into the recess 27. It will be appreciated that this deformation of the collar as was the case in the preferred embodiment of the invention described above, serves to deform the bore of the collar to uniform diameter throughout its axial length and consequently this internal bore may be threaded to receive a suitable adjusting stud.

From the foregoing it will be appreciated that the above described embodiments of the invention are merely illustrative of the generic inventive concept presented and many other and further modifications falling within the scope of the sub-joined claims will be apparent to those skilled in the art.

We claim as our invention:

1. A valve tappet comprising a generally cylindrical body portion having a hollow interior and relatively thick integrally formed walls at each of its axial ends, the axial wall in one end of said tappet having an axial aperture therethrough of substantially smaller diameter than the interior diameter of said hollow tappet body, a relatively malleable collar snugly seated in said aperture and having portions of larger diameter than the diameter of said aperture immediately adjacent each of the ends of said aperture, said collar having an internally threaded bore therethrough adapted to receive an adjusting screw.

2. A tappet comprising a generally cylindrical cast, a relatively hard and brittle body portion, said body portion being hollow and having relatively thick axial end walls, one of said walls having an aperture therethrough of substantially smaller diameter than the interior diameter of said tappet body, a relatively malleable collar seated in said aperture and projecting beyond the ends thereof, the end portions of said collar being of larger diameter than the interior diameter of said aperture whereby to positively preclude axial movement of said collar in said aperture in both directions, the exterior surface of said collar snugly engaging the interior of said bore to further lock said collar in position with respect thereto, said collar having an internally threaded bore therethrough adapted to receive an adjusting screw.

JOSEPH H. HOERN.
FREDERICK A. WELSMILLER.